United States Patent
Uenishi

(10) Patent No.: US 8,009,975 B2
(45) Date of Patent: Aug. 30, 2011

(54) IMAGING APPARATUS AND FOCUSING CONTROL METHOD

(75) Inventor: Masaaki Uenishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 210 days.

(21) Appl. No.: 12/205,117

(22) Filed: Sep. 5, 2008

(65) Prior Publication Data

US 2009/0074392 A1 Mar. 19, 2009

(30) Foreign Application Priority Data

Sep. 14, 2007 (JP) ................................. 2007-240183

(51) Int. Cl.
*G03B 3/00* (2006.01)
*G03B 3/10* (2006.01)
(52) U.S. Cl. ....................................... 396/104; 396/121
(58) Field of Classification Search .................... 396/89, 396/103, 104, 121–124; 348/345, 349, 353, 348/354
See application file for complete search history.

(56) References Cited

U.S. PATENT DOCUMENTS

2007/0263997 A1* 11/2007 Hirai et al. .................... 396/123

FOREIGN PATENT DOCUMENTS

| JP | 11-215426 A | 8/1999 |
| JP | 2000-307932 A | 11/2000 |

OTHER PUBLICATIONS

JP-2000-307932 Machine Translation available from JPO website.*

* cited by examiner

*Primary Examiner* — W. B. Perkey
*Assistant Examiner* — Minh Q Phan
(74) *Attorney, Agent, or Firm* — Canon U.S.A., Inc. IP Division

(57) ABSTRACT

An imaging apparatus sets a main area and a plurality of subareas around the main area in an image obtained from an image sensor, and acquires each focusing state and each in-focus point based on the each focusing state of the main area and the plurality of subareas in an image obtained from the image sensor at each of a plurality of focus lens positions while moving a focus lens. If the focusing state of the main area does not satisfy a predetermined condition, the imaging apparatus performs focusing control using the focusing state of the main area and a focusing state of a subarea having an in-focus point located within a predetermined range from the in-focus point of the main area among the plurality of subareas.

7 Claims, 8 Drawing Sheets

IMAGING APPARATUS AND FOCUSING CONTROL METHOD

BACKGROUND OF THE INVENTION

1. Field of the Invention

The present invention relates to an imaging apparatus and a focusing control method. More particularly, the present invention relates to an imaging apparatus, e.g., an electronic still camera and a video camera, and a focusing control method utilized for the imaging apparatus.

2. Description of the Related Art

A conventional method to focus on an object in an imaging apparatus, such as an electronic still camera, includes an autofocus system which automatically moves the position of a focus lens using a luminance signal obtained from an image sensor, such as a charge-coupled device (CCD), so as to perform a focusing operation. A general automatic focusing apparatus using the autofocus system calculates an in-focus point by detecting a position of a focus lens enabling the highest contrast based on a focus evaluation value obtained by integrating high-frequency components of a signal in a focus adjustment area set in a pixel area of the image sensor.

However, the automatic focusing apparatus has problems, when illuminance of an object is low or the amount of a high-frequency component is small due to low contrast of an object, that a focus evaluation value becomes low. Further, the ratio of noise components included in a luminance signal becomes high, so that focusing accuracy decreases.

In order to solve the above-described problem, Japanese Patent Application Laid-Open No. 11-215426 discusses an autofocus apparatus which expands a focus adjustment area when the illuminance of an object is lower than a predetermined value, thus improving signal to noise (S/N) ratio and improving focusing accuracy at low illuminance.

Japanese Patent Application Laid-Open No. 2000-307932 discusses an autofocus apparatus which acquires focus evaluation values in a plurality of focus adjustment areas and performs the following control when a peak of a sufficient focus evaluation value is not obtained in each focus adjustment area. That is, if there is a plurality of focus adjustment areas having similar peak positions of focus evaluation values, the autofocus apparatus selects these focus adjustment areas, calculates an average position of the peak positions in respective focus adjustment areas, and sets the calculated average position as an in-focus position. Thus, the autofocus apparatus can improve reliability of a focus evaluation value peak at low illuminance.

However, when the autofocus apparatus expands a focus adjustment area as discussed in Japanese Patent Application Laid-Open No. 11-215426, an object other than a main object, e.g., a background, may enter the focus adjustment area, and thus the apparatus may focus on an object other than a main object.

Furthermore, when a focus adjustment area having a similar peak position of selected focus evaluation value is a focus adjustment area including an object other than a main object, as discussed in Japanese Patent Application Laid-Open No. 2000-307392, the apparatus cannot select a frame including the main object and, thus, cannot focus on the main object. Further, when an average position of peak positions in a plurality of focus adjustment areas is calculated, the apparatus cannot cancel randomly generated noises and, thus, cannot improve S/N ratio.

SUMMARY OF THE INVENTION

The present invention is directed to improving focusing accuracy for a main object when reliability of a focusing result in a main focus adjustment area is low due to low illuminance or low contrast of a main object.

According to an aspect of the present invention, an imaging apparatus includes a setting unit configured to set a main area and a plurality of subareas around the main area in an image obtained from an imaging unit, an acquisition unit configured to acquire each focusing state and each in-focus point based on the each focusing state of the main area and the plurality of subareas in an image obtained from the imaging unit at each of a plurality of focus lens positions while moving a focus lens, a determination unit configured to determine whether the focusing state of the main area satisfies a predetermined condition, and a focusing control unit configured to, if it is determined by the determination unit that the focusing state of the main area does not satisfy the predetermined condition, perform focusing control using the focusing state of the main area and a focusing state of a subarea having an in-focus point located within a predetermined range from the in-focus point of the main area among the plurality of subareas.

According to another aspect of the present invention, a focusing control method includes setting a main area and a plurality of subareas around the main area in an image obtained from an imaging unit, acquiring each focusing state and each in-focus point based on the each focusing state of the main area and the plurality of subareas in an image obtained from the imaging unit at each of a plurality of focus lens positions while moving a focus lens, determining whether the focusing state of the main area satisfies a predetermined condition, and, if it is determined that the focusing state of the main area does not satisfy the predetermined condition, performing focusing control using the focusing state of the main area and a focusing state of a subarea having an in-focus point located within a predetermined range from the in-focus point of the main area among the plurality of subareas.

According to yet another aspect of the present invention, an imaging apparatus includes a setting unit configured to set a main area and a subarea internally including the main area in an image obtained from an imaging unit, an acquisition unit configured to acquire each focusing state and each in-focus point based on the each focusing state of the main area and the subarea in an image obtained from the imaging unit at each of a plurality of focus lens positions while moving a focus lens, a determination unit configured to determine whether the focusing state of the subarea satisfies a predetermined condition if the focusing state of the main area does not satisfy the predetermined condition, and a focusing control unit configured to, if it is determined by the determination unit that the focusing state of the subarea satisfies the predetermined condition and the in-focus points of the main area and the subarea are located within a predetermined range, perform focusing control using the focusing states of the main area and the subarea.

According to yet another aspect of the present invention, a focusing control method includes setting a main area and a subarea internally including the main area in an image obtained from an imaging unit, acquiring each focusing state and each in-focus point based on the each focusing state of the main area and the subarea in an image obtained from the imaging unit at each of a plurality of focus lens positions while moving a focus lens, determining whether the focusing state of the subarea satisfies a predetermined condition if the focusing state of the main area does not satisfy the predetermined condition, and, if it is determined that the focusing state of the subarea satisfies the predetermined condition and the in-focus points of the main area and the subarea are located within a predetermined range, performing focusing control using the focusing states of the main area and the subarea.

Exemplary embodiments of the present invention can improve focusing accuracy when reliability of a focusing result in a main focus adjustment area is low due to low illuminance or low contrast of a main object.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
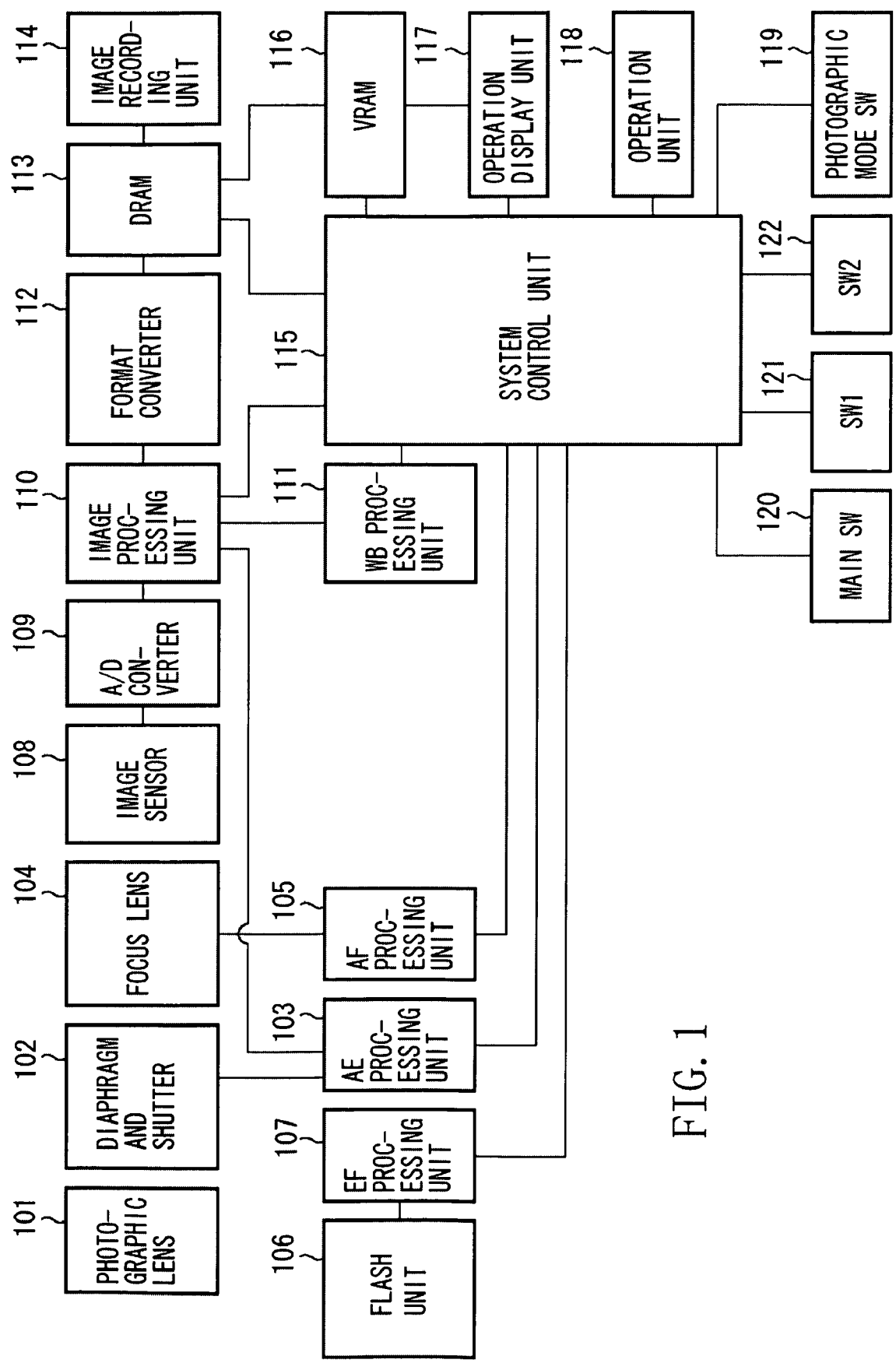
FIG. 1 is a block diagram illustrating an example configuration of an electronic camera according to an exemplary embodiment of the present invention.

FIG. 1 is a block diagram illustrating a configuration of an electronic camera according to the first exemplary embodiment of the present invention.

The electronic camera includes a photographic lens 101 including a zoom mechanism, a diaphragm and shutter 102 configured to control the amount of light, an automatic exposure (AE) processing unit 103, a focus lens 104 movable to perform focusing on an image sensor 108, an automatic focus (AF) processing unit 105, a flash unit 106, a flash (EF) processing unit 107, and the image sensor 108 configured to convert incident light into an electrical signal.

The electronic camera further includes an analog-to-digital (A/D) converter 109 including a correlated double sampling (CDS) circuit configured to eliminate an output noise from the image sensor 108 and a nonlinear amplifying circuit operable before A/D conversion, an image processing unit 110, a white balance (WB) processing unit 111, and a format converter 112. A high-speed built-in memory 113 is, for example, a random access memory (hereinafter referred to as DRAM) used as a high-speed buffer functioning as a temporary image storing unit or an operation memory in compressing and expanding an image. An image recording unit 114 includes a recording medium, such as a memory card, and an interface of the recording medium.

The electronic camera further includes a system control unit 115 configured to control the electronic camera, for example, to control an imaging sequence, an image display memory 116 (hereinafter referred to as VRAM), and an operation display unit 117 configured to display an image, an operation guidance, a camera state, and a focus adjustment area on a photographing screen at the time of photographing. An operation unit 118 is operable to externally operate the camera. The operation unit 118 includes, for example, a menu switch operable to perform various types of setting, e.g., setting of a photographing function of the electronic camera and setting at the time of reproducing an image, a zoom lever operable to instruct a zoom operation of the photographic lens 101, and an operation mode changeover switch operable to switch a photographing mode and a reproduction mode. The electronic camera further includes a photographic mode switch (SW) 119 operable to set a mode of photographing, a main switch 120 operable to supply power to the electronic camera, a switch 121 (hereinafter referred to as SW1) operable to instruct a photographing standby operation, such as auto-focus (AF) or auto-exposure (AE), and a photographing switch 122 (hereinafter referred to as SW2) operable to instruct photographing after operating the SW1 121.

Then, a focusing control operation of the electronic camera having the above-described configuration according to the present embodiment will be described in detail below with reference to FIGS. 2 to 7. The system control unit 115 performs the focusing control operation in cooperation with the image processing unit 110.

Figure 2:
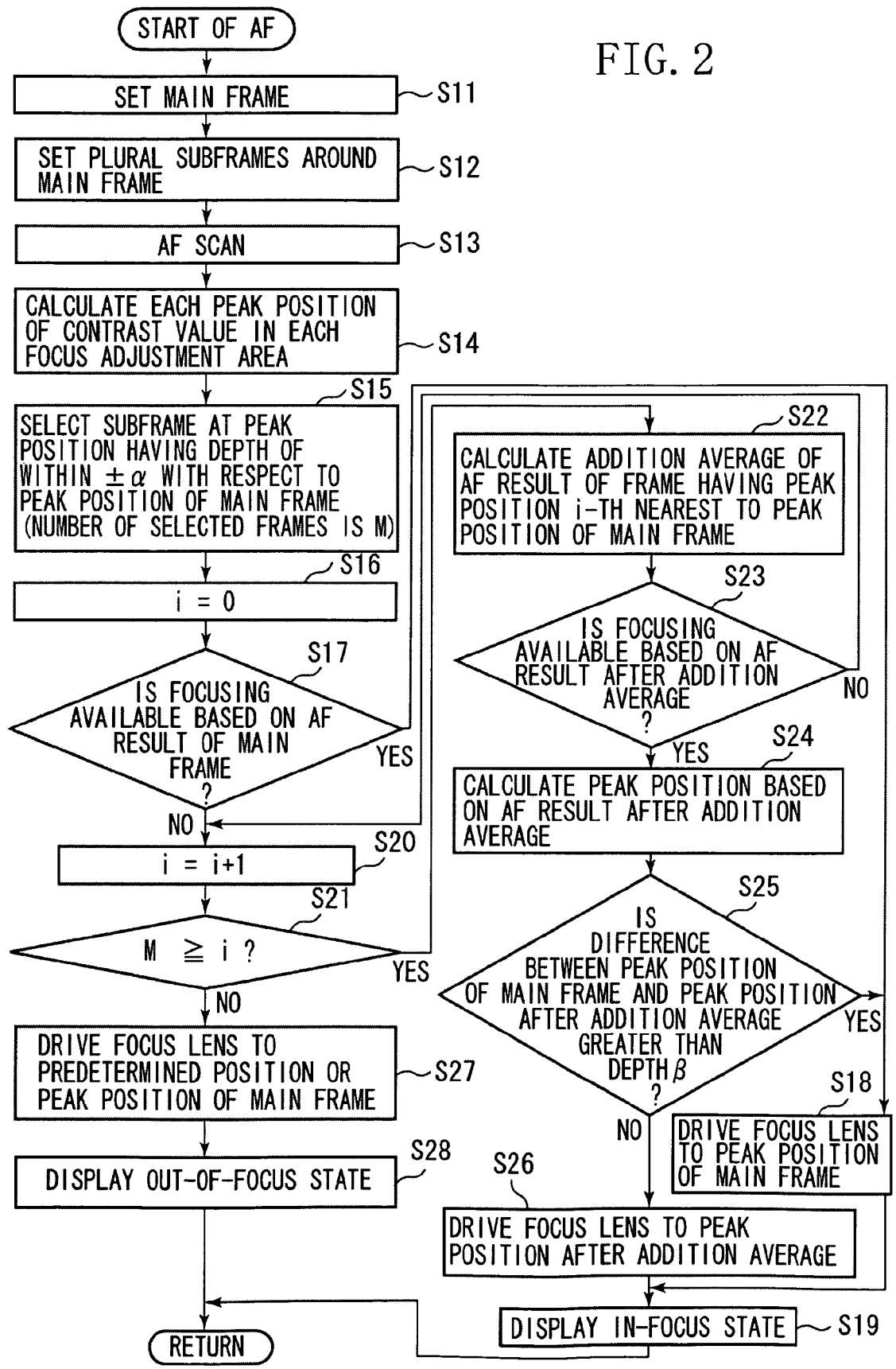
FIG. 2 is a flowchart illustrating focusing control according to a first exemplary embodiment of the present invention.
Figure 3A:
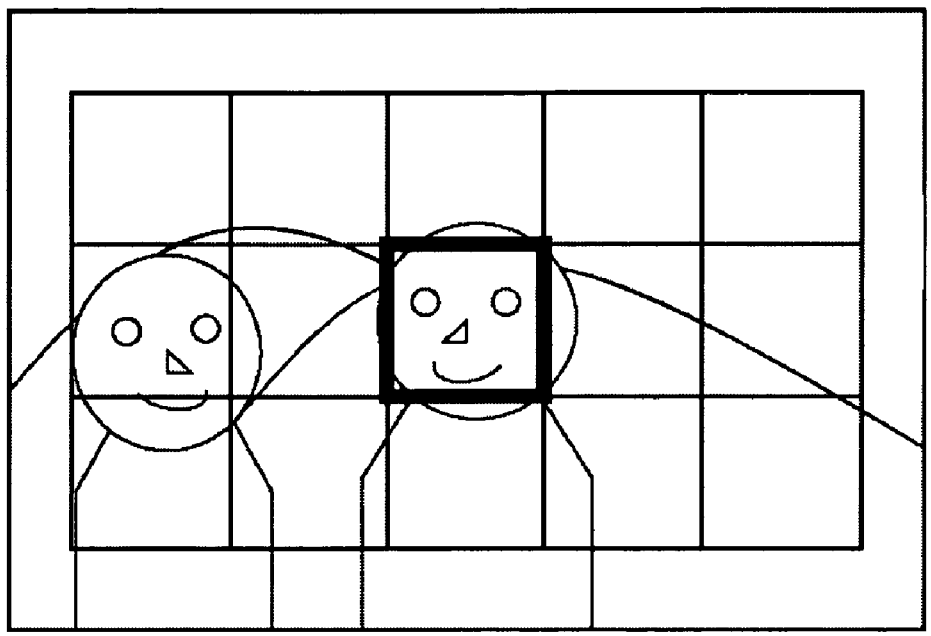
FIGS. 3A and 3B illustrate example methods for setting a focus adjustment area according to the first exemplary embodiment of the present invention.
Figure 3B:
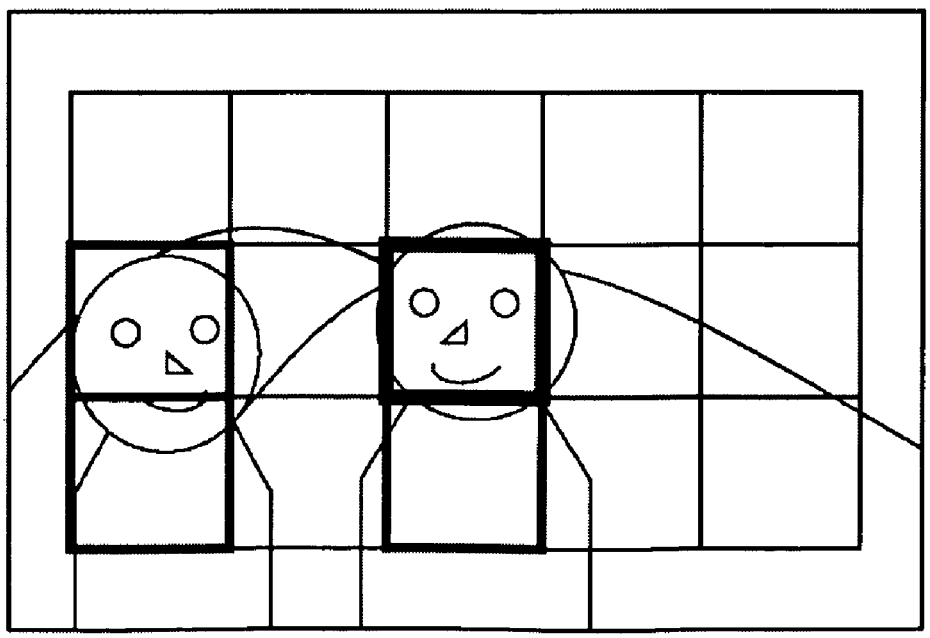

FIG. 2 is a flowchart illustrating a focusing control procedure according to the present embodiment, and FIGS. 3A and 3B illustrate focus adjustment areas in the focusing control.

Referring to FIG. 2, when focusing control starts, the processing proceeds to step S11. In step S11, the system control unit 115 sets a frame (hereinafter referred to as a main frame) indicating a focus adjustment area (a main area) which can be considered to include a main object therein, and then the processing proceeds to step S12. The position and size of the main frame can be the center of a screen and an arbitrary size, a position and size determined based on a detected result of the main object using a face detection method or a moving object detection method, or a position and size arbitrarily instructed by a user.

In step S12, the system control unit 115 sets frames (hereinafter referred to as subframes) indicating a plurality of focus adjustment areas (subareas) around the main frame, and then the processing proceeds to step S13. The number of plural subframes is A×B (A and B are arbitrary integers) including the main frame (illustrated with a thick frame) and the size thereof is the same as that of the main frame, as illustrated in FIG. 3A (the number is 5×3 in FIG. 3A). The number, size, and position of subframes are not limited to those illustrated in FIG. 3A. In step S13, the system control unit 115 loads images from the focus adjustment areas (the main frame and the subframes), which are set in step S11 and step S12, while moving the focus lens 104. Then, the system control unit 115 performs AF scanning to acquire a contrast value (or a focus evaluation value) indicating a focusing state of each focus adjustment area, and then the processing proceeds to step S14.

In step S14, the system control unit 115 acquires a peak position of the focus lens 104 having a maximum focus evaluation value acquired in step S13, i.e., an in-focus point, for every focus adjustment area by calculation, and then the processing proceeds to step S15. In step S15, the system control unit 115 selects a subframe or subframes having a peak position at a depth of within ±α (within a predetermined range), which is a predetermined range previously set with respect to a peak position of the main frame, and then the processing proceeds to step S16. Since the subframe or subframes selected in step S15 (the number of selected subframes is M) are an area in which the main object presumably exists, the system control unit 115 uses peak positions (AF results) of the selected subframes if the reliability of a calculated peak position (AF result) of the main frame is low. FIG. 3B illustrates a case where three subframes (that is, M=3) including an object having the approximately same distance as the main object in the main frame are selected by AF result.

In step S16, the system control unit 115 initializes a variable i indicating a frame whose AF result is to be used, and then the processing proceeds to step S17. In step S17, the system control unit 115 determines whether focusing is available based on the AF result of the main frame. If focusing is available (YES in step S17), the processing proceeds to step S18. In step S18, the system control unit 115 drives the focus lens 104 to a peak position of the main frame, and then the processing proceeds to step S19. If focusing is not available (NO in step S17), the processing proceeds to step S20. A method for determining whether focusing is available in step S17 will be described in detail below with reference to FIGS. 4 to 7.

In step S20, the system control unit 115 increments the variable i, which indicates a frame whose AF result is to be used, and then the processing proceeds to step S21. In step S21, the system control unit 115 determines whether a subframe whose AF result can be used exists, that is, whether the number M of subframes selected in step S15 is equal to or greater than the variable i. If a subframe whose AF result can be used exists (YES in step S21), the processing proceeds to step S22. If no subframe whose AF result can be used exists (NO in step S21), the processing proceeds to step S27. In step S22, the system control unit 115 calculates an addition average of an AF result of a subframe having a peak position i-th nearest to a peak position of the main frame among the subframes selected in step S15, and then the processing proceeds to step S23.

More specifically, addition average is performed as follows. In AF scanning performed in step S13, positions of the focus lens 104 are a, b, c, d, ..., and focus evaluation values of the main frame at the respective positions of the focus lens 104 are P(a), P(b), P(c), P(d) .... Further, focus evaluation values of the subframe having a peak position i-th nearest to the peak position of the main frame are Qi (a), Qi (b), Qi (c), Qi (d) .... The AF results after addition average A(a), A(b), A(c), A(d), ..., are as follows:

$$A(a) = \frac{[P(a) + \sum Qi(a)]}{(i+1)}$$

$$A(b) = \frac{[P(b) + \sum Qi(b)]}{(i+1)}$$

$$A(c) = \frac{[P(c) + \sum Qi(c)]}{(i+1)}$$

$$A(d) = \frac{[P(d) + \sum Qi(d)]}{(i+1)}$$

In step S23, the system control unit 115 determines whether focusing is available based on AF results after addition average A(a), A(b), A(c), A(d).... If focusing is available (YES in step S23), the processing proceeds to step S24. If focusing is not available (NO in step S23), the processing proceeds to step S20. Determination of focusing in step S23 is performed by a similar method to that in step S17, which will be described below with reference to FIGS. 4 to 7. In step S24, the system control unit 115 calculates a peak position based on the AF results after addition average A(a), A(b), A(c), A(d), ..., and then the processing proceeds to step S25. In step S25, the system control unit 115 determines whether a difference between the peak position of the main frame and the peak position after addition average is greater than a depth β. If the difference is greater than the depth β (YES in step S25), the processing proceeds to step S18. If the difference is not greater than the depth β (NO in step S25), the processing proceeds to step S26. In step S26, the system control unit 115 drives the focus lens 104 to the peak position after addition average, and then the processing proceeds to step S19.

In step S19, the system control unit 115 displays an in-focus state, and then focusing control ends. The system control unit 115 can display only the main frame as an in-focus display frame. However, when subframes used for addition average exist, the system control unit 115 can display all of the frames used for addition average as in-focus display areas.

In step S27, since focusing control using a focus evaluation values is not available, the system control unit 115 drives the focus lens 104 to a predetermined position or the peak position of the main frame, and then the processing proceeds to step S28. In step S28, the system control unit 115 displays an out-of-focus state, and then focusing control ends.

Now, a method for determining whether focusing is available in steps S17 and S23 will be described in detail below with reference to FIGS. 4 to 7. This determination is performed according to whether a focus evaluation value satisfies a predetermined condition.

Figure 7:
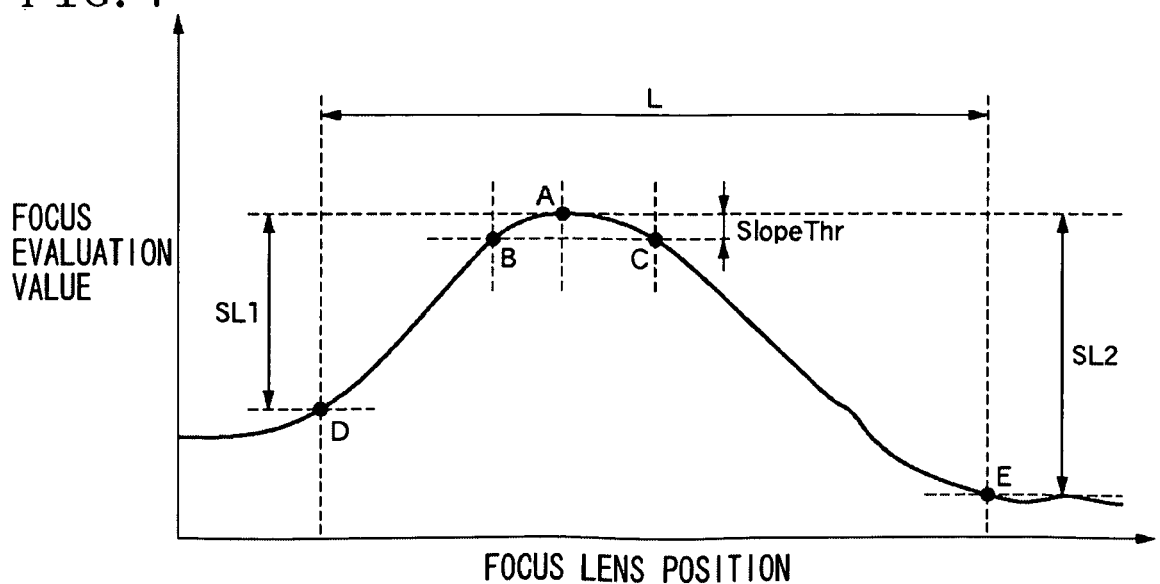
FIG. 7 illustrates the relationship between a focus lens position and a focus evaluation value when focusing is available.

When a focus evaluation value is shown with a graph having a focus lens position at the abscissa axis and a focus evaluation value at the ordinate axis, the shape is a hill shape as illustrated in FIG. 7, except specific cases, such as a conflict between far and near objects. Therefore, the system control unit 115 can perform focusing determination by determining whether a focus evaluation value has a hill shape based on a difference between a maximum value and a minimum value of the focus evaluation value, the length of a part inclining with a inclination equal to or greater than a predetermined value (SlopeThr), and the slope of an inclining part. The result of the focusing determination is output with 0 or 1 as illustrated below.

0: Focus adjustment of an object is available based on a peak position of the focus evaluation value.

1: Contrast of an object is insufficient or an object is located at a distance outside a scanned distance range.

As illustrated in FIG. 7, points up to which inclination is continued from a hill top (point A) are denoted as point D and point E, the width between point D and point E is denoted as a width L of the hill, a difference between a focus evaluation values at point A and point D is denoted as SL1, a difference between the focus evaluation values at point A and point E is denoted as SL2, and the sum of SL1 and SL2 is denoted as SL. Points B and C each indicate a point at which the focus evaluation value has decreased by a predetermined value SlopeThr with respect to point A.

Figure 4:
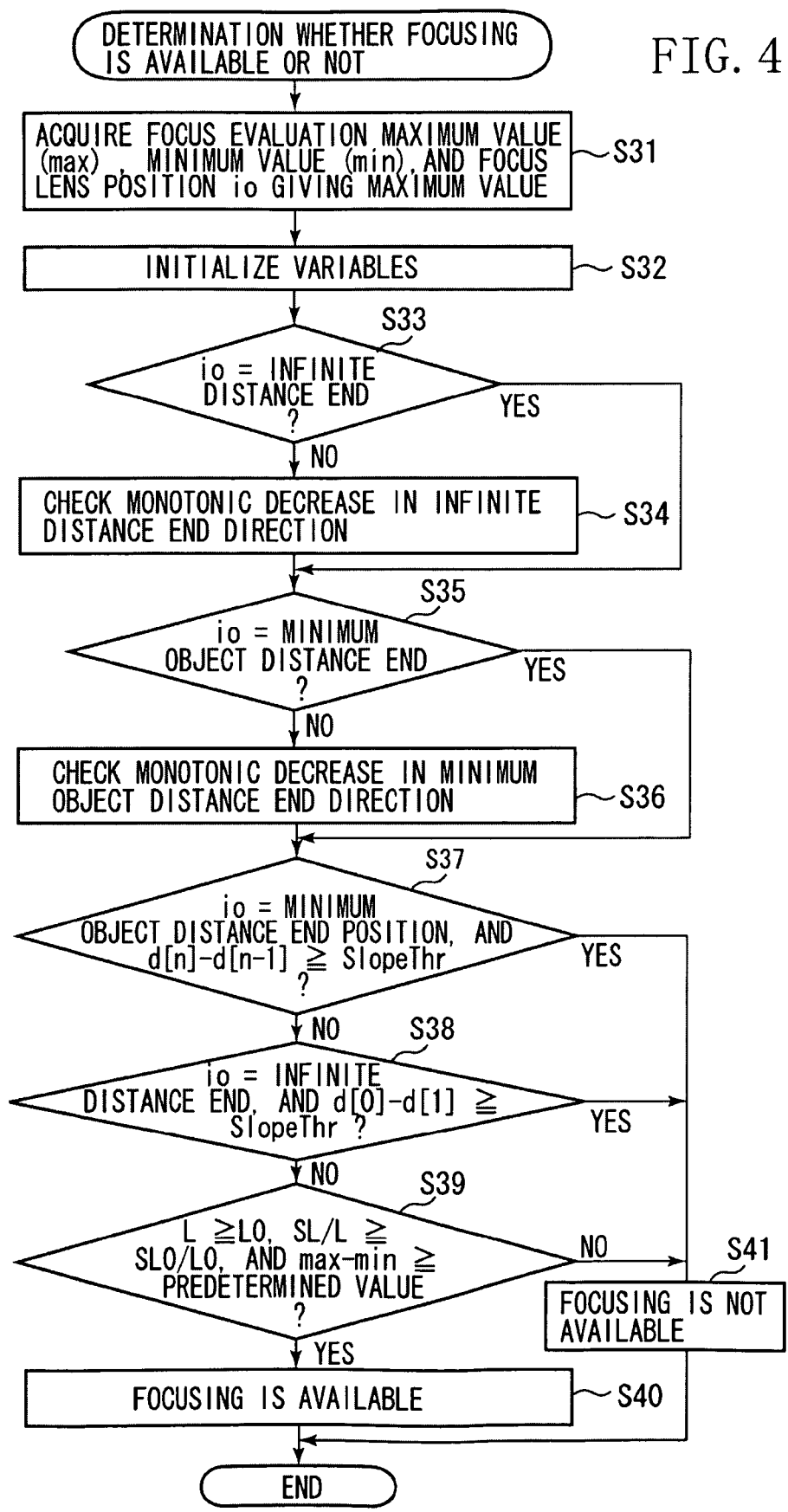
FIG. 4 is a flowchart illustrating focusing determination processing according to the first exemplary embodiment of the present invention.

FIG. 4 is a flowchart of a method for determining whether focusing is available, which is performed in steps S17 and S23 in the flowchart of FIG. 2.

In step S31, the system control unit 115 acquires a focus evaluation maximum value, minimum value, and a focus lens 104 position io (a scan point) giving the maximum value. In step S32, the system control unit 115 initializes variables L and SL to 0, where L indicates a width of the hill of a focus evaluation value and SL indicates a slope of the hill. In step S33, the system control unit 115 determines whether the scan point io giving the maximum value is an infinite distance end position in a scanned predetermined area. If the scan point io is not the infinite distance end position (NO in step S34), the processing proceeds to step S34. In step S34, the system control unit 115 checks a monotonic decrease in an infinite distance end direction. If the scan point io is the infinite distance end position (YES in step S34), the processing skips step S34 and then proceeds to step S35.

Figure 5:
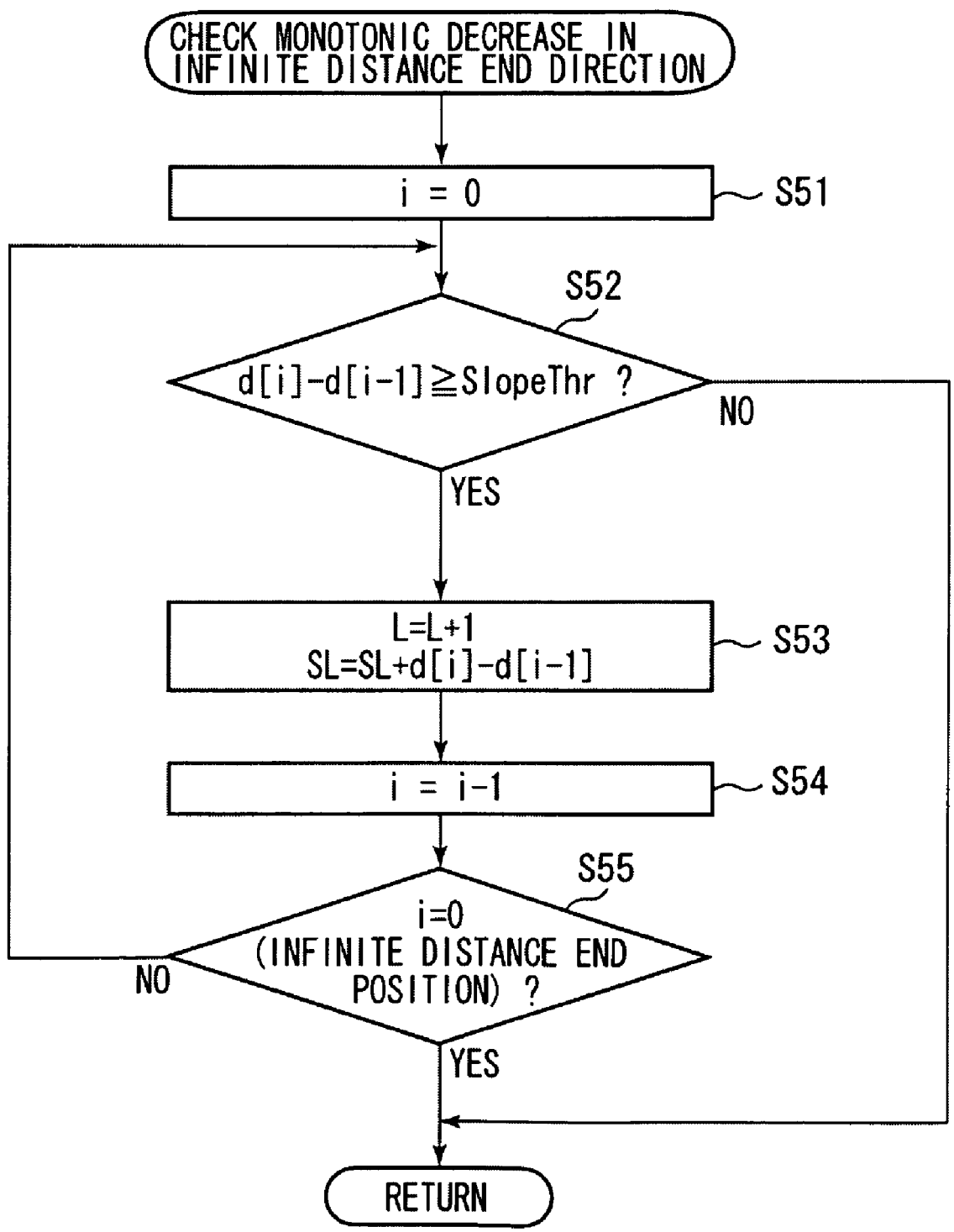
FIG. 5 is a flowchart illustrating a checking procedure of monotonic decrease in an infinite distance end direction performed in step S34 in FIG. 4.

Here, processing for checking a monotonic decrease in the infinite distance end direction in step S34 will be described below with reference to the flowchart of FIG. 5.

In step S51, the system control unit 115 initializes a counter variable i to io. In step S52, the system control unit 115 compares a difference between a value d[i] of a focus evaluation value in a scan point i and a value d[i−1] of a focus evaluation value in a scan point i−1 with a predetermined value SlopeThr. The scan point i−1 is nearer to the infinite distance end side by one scan point than the scan point i. If the relation is not d[i]−d[i−1] >SlopeThr (NO in step S52), the system control unit 115 determines that a monotonic decrease in the infinite distance end direction does not occur. Then, the processing for checking a monotonic decrease in the infinite distance end direction ends. Then, the processing proceeds to step S35 in FIG. 4.

If the relation is d[i]−d[i−1]≧SlopeThr (YES in step S52), the system control unit 115 determines that a monotonic decrease in the infinite distance end direction occurs, and then the processing proceeds to step S53. In step S53, the system control unit 115 updates the variable L indicating the length of a part (a width of hill) where the focus evaluation value inclines with a inclination equal to or greater than a predetermined value, and the variable SL indicating an amount of decrease in a monotonic decrease range according the following formulae:

$$L=L+1$$

$$SL=SL+(d[i]-d[i-1])$$

In step S54, the system control unit 115 decrements the counter variable i as i=i−1 to shift a point to be detected by one scan point towards the infinite distance end side. In step S55, the system control unit 115 checks whether the counter variable i has become a value at the infinite distance end position (=0) in a scanned predetermined area. If the value of the counter variable i is 0, that is, if the start point to detect a monotonic decrease reaches the infinite distance end position in the scanned predetermined area (YES in step S55), the processing for checking a monotonic decrease in the infinite distance end direction ends. Then, the processing proceeds to step S35. If the value of the counter variable i is not 0 (NO in step S55), the processing returns to step S52.

As described above, the system control unit 115 checks a monotonic decrease in the infinite distance end direction from i=io.

Referring back to FIG. 4, in step S35, the system control unit 115 determines whether the scan point io giving the maximum value of the focus evaluation value is a minimum object distance end position in the scanned predetermined area. If the scan point io is not the minimum object distance end position (NO in step S35), the processing proceeds to step S36. In step S36, the system control unit 115 checks a monotonic decrease in the minimum object distance end direction. If the scan point io is the minimum object distance end position (YES in step S35), the processing skips step S36 and then proceeds to step S37.

Figure 6:
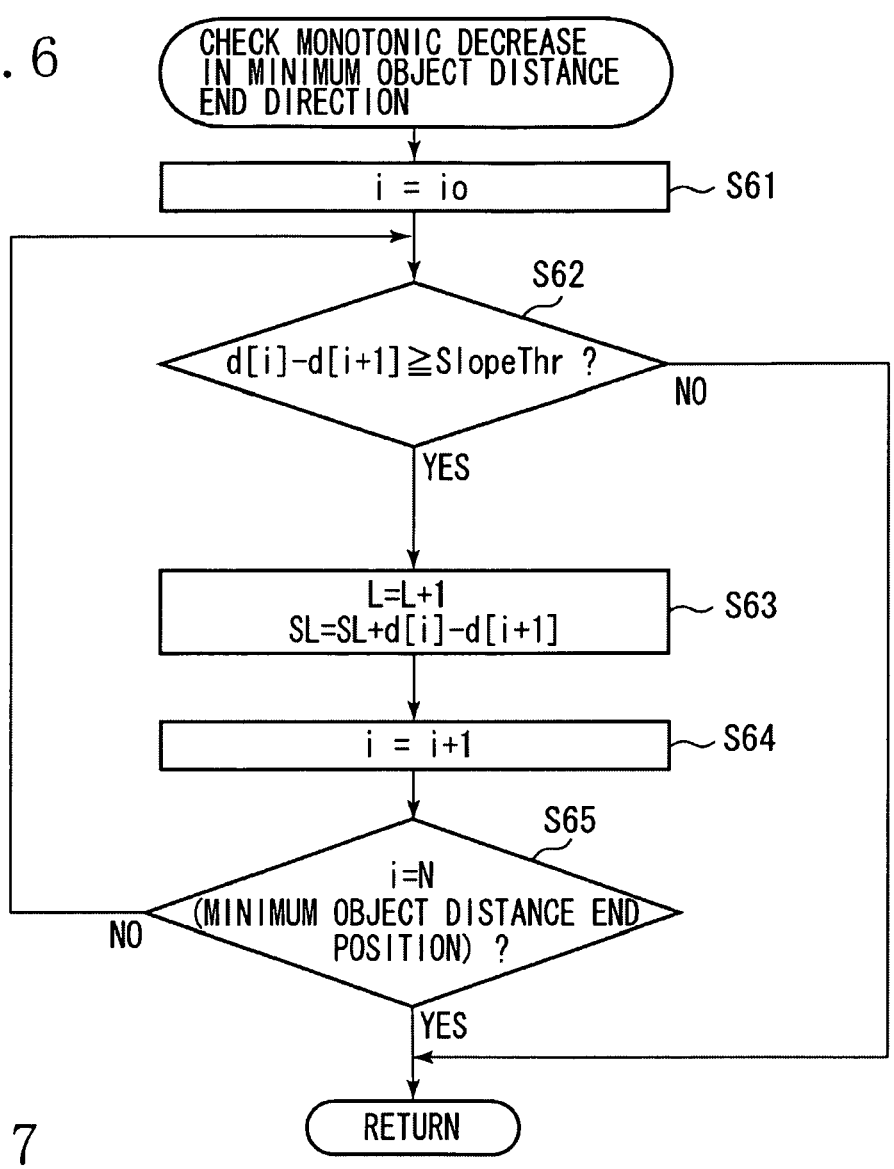
FIG. 6 is a flowchart illustrating a checking procedure of monotonic decrease in a minimum object distance end direction performed in step S36 in FIG. 4.

Here, the processing for checking a monotonic decrease in the minimum object distance end direction in step S36 will be described below with reference to FIG. 6.

In step S61, the system control unit 115 initializes the counter variable i to io. In step S62, the system control unit 115 compares a difference between a value d[i] of a focus evaluation value in a scan point i and a value d[i+1] of a focus evaluation value in a scan point i+1 with a predetermined value SlopeThr. The scan point i+1 is nearer to the minimum object distance end side by one scan point than the scan point i. If the relation is not d[i]−d[i+1]≧SlopeThr (NO in step S62), the system control unit 115 determines that a monotonic decrease in the minimum object distance end direction does not occur. Then, the processing for checking a monotonic decrease in the minimum object distance end direction ends. Then, the processing proceeds to step S37 in FIG. 4.

On the other hand, if the relation is d[i]−d[i+1]≧SlopeThr (YES in step S62), the system control unit 115 determines that a monotonic decrease in the minimum object distance end direction occurs. Then, the processing proceeds to step S63. In step S63, the system control unit 115 updates the variable L indicating the length of a part (a width of hill) where the focus evaluation value inclines with a inclination equal to or greater than a predetermined value, and the variable SL indicating an amount of decrease in a monotonic decrease range according the following formulae:

$$L=L+1$$

$$SL=SL+(d[i]-d[i+1])$$

In step S64, the system control unit 115 increments the counter variable i as i=i+1 to shift a point to be detected by one scan point towards the minimum object distance end side. In step S65, the system control unit 115 checks whether the counter variable i has become a value (=N) at the minimum object distance end position in a scanned predetermined range. If the value of the counter variable i reaches N, that is, the start point to detect a monotonic decrease reaches the minimum object distance end position in the scanned predetermined range (YES in step S65), the processing for checking a monotonic decrease in the minimum object distance end direction ends. Then, the processing proceeds to step S37. If the value of the counter variable i is not N (NO in step S65), the processing returns to step S52.

As described above, the system control unit 115 checks a monotonic decrease in the minimum object distance end direction from i=io.

When the processing for checking a monotonic decrease in the infinite distance end direction and the minimum object distance end direction ends, the system control unit 115 compares each coefficient with a threshold value to check whether the calculated focus evaluation value has a hill shape, and determines whether focusing is available.

In step S37, the system control unit 115 determines whether the following two conditions are simultaneously satisfied. That is, the system control unit 115 determines whether the scan point io giving the maximum value of the focus evaluation value is the minimum object distance end position in the scanned predetermined range. Further, the system control unit 115 determines whether a difference between the value d[n] of a focus evaluation value in a scan point n and a value d[n−1] of a focus evaluation value in a scan point n−1 is equal to or greater than the predetermined value SlopeThr. The scan point n−1 is nearer to the infinite distance end side by one scan point than the san point n. If the scan point io is the minimum object distance end position and the difference is equal to or greater than the predetermined value SlopeThr (YES in step S37), the processing proceeds to step S41. If not both of these conditions are satisfied (NO in step S37), the processing proceeds to step S38.

In step S38, the system control unit 115 determines whether the following two conditions are simultaneously satisfied. That is, the system control unit 115 determines whether the scan point io giving the maximum value of the focus evaluation value is the infinite distance end position in the scanned predetermined range. Further, the system control unit 115 determines whether a difference between the value d[0] of a focus evaluation value in the scan point 0 and a value d[1] of a focus evaluation value in the scan point 1 is equal to or greater than the predetermined value SlopeThr. The san point 1 is nearer to the minimum object distance end side by one scan point than the san point 0. If the scan point io is the infinite distance end position and the difference is equal to or greater than the predetermined value SlopeThr (YES in step S38), the processing proceeds to step S41. If not both of these conditions are satisfied (NO in step S38), the processing proceeds to step S39.

In step S39, the system control unit 115 determines whether the following three conditions are simultaneously satisfied. The system control unit 115 determines whether the length of a part L inclining with a inclination equal to or greater than a predetermined value is equal to or greater than a predetermined value L0. Further, the system control unit 115 determines whether an average value SL/L of the inclining part is equal to or greater than a predetermined value SL0/L0. Furthermore, the system control unit 115 determines whether the difference between a maximum value and a minimum value of the focus evaluation value is equal to or greater than a predetermined value. If the length L is equal to or greater than the predetermined value L0, the average value SL/L is equal to or greater than the predetermined value SL0/L0, and the difference between the maximum value and the minimum value of the focus evaluation value is equal to or greater than the predetermined value (YES in step S39), the processing proceeds to step S40. If not all of these conditions are satisfied (NO in step S39), the processing proceeds to step S41. In step S40, the system control unit 115 sets a determined result to 0 since the calculated focus evaluation value has a hill shape and focus adjustment of an object is available. On the other hand, in step S41, the system control unit 115 sets a determined result to 1 since the calculated focus evaluation value does not have a hill shape and focus adjustment of an object is not available.

As described above, the system control unit 115 performs a determination as to whether focusing is available.

According to the above-described exemplary embodiment, when focusing is not available based only a focus evaluation value in a main focus adjustment area, the system control unit 115 performs focusing control using a focus adjustment subarea or subareas having an object in an approximately same distance around the main focus adjustment area. As a result, there is no problem such as missing of a background, a focus adjustment area can be expanded, and the S/N ratio can be improved. Thus, focusing accuracy can be improved.

In addition, when reliability of a focus evaluation value of a main frame is low, AF results of focus evaluation values of plural subframes around the main frame can be used only in the case of a dark condition.

Second Exemplary Embodiment

A second exemplary embodiment of the present invention will be described below.

The first exemplary embodiment improves reliability of a focusing result of a main frame by adding focus adjustment areas around the main frame. On the other hand, the second exemplary embodiment uses another focusing control method to improve reliability of an AF result of a main frame.

Figure 8:
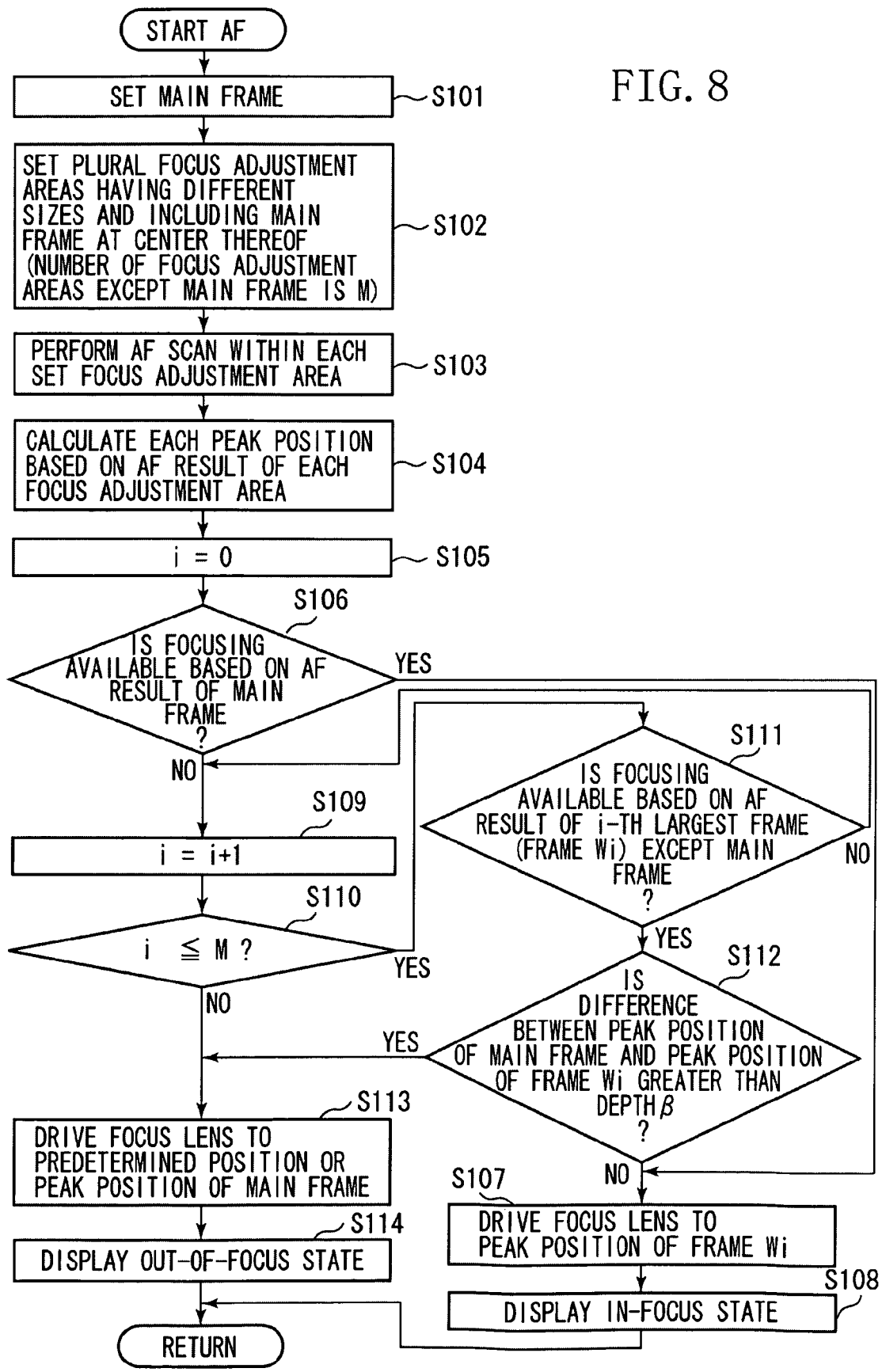
FIG. 8 is a flowchart illustrating focusing control according to a second exemplary embodiment of the present invention.
Figure 9:
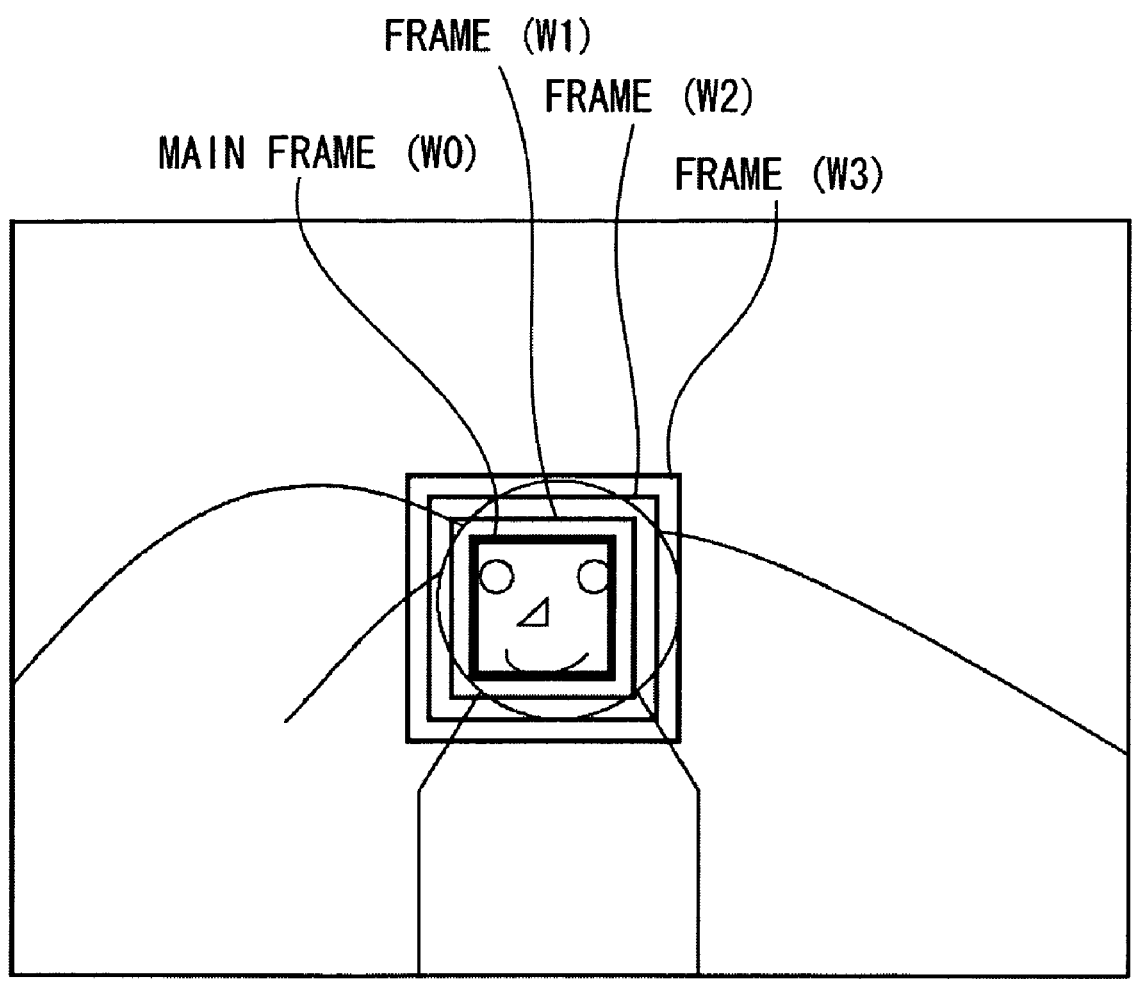
FIG. 9 illustrates a method for setting focus adjustment areas according to the second exemplary embodiment of the present invention.

FIG. 8 is a flowchart illustrating focusing control according to the second exemplary embodiment. FIG. 9 illustrates focus adjustment areas according to the second exemplary embodiment of the present invention.

In the present embodiment, when focusing control starts, the processing proceeds to step S101. In step S101, the system control unit 115 sets a main frame. Similar to the first exemplary embodiment, the position and size of the main frame can be a screen center and an arbitrary size, a position and size determined based on a detected result of the main object using a face detection method a moving object detection method, or a position and size arbitrarily instructed by a user. In step S102, the system control unit 115 sets a plurality of focus adjustment areas (hereinafter referred to as subframes) having different sizes and internally including the main frame at a center thereof, and then the processing proceeds to step S103. The number of set subframes is M. For example, as illustrated in FIG. 9, the system control unit 115 sets the subframes, such as a frame W1, a frame W2, and a frame W3, to include a main frame (W0) at a center thereof. FIG. 9 illustrates a case where M is 3.

In step S103, the system control unit 115 performs AF scanning, and then the processing proceeds to step S104. In AF scanning, the system control unit 115 loads images from focus adjustment areas (including the main frame and the subframes), which are set in step S101 and step S102, while driving the focus lens 104, and acquires a contrast value (focus evaluation value) of each focus adjustment area.

In step S104, the system control unit 115 calculates a peak position of the focus lens 104 at which the focus evaluation value acquired in step S103 becomes maximum, and then the processing proceeds to step S105. In step S105, the system control unit 115 initializes a variable i indicating the order of size of a focus adjustment area to 0, and then the processing proceeds to step S106.

In step S106, the system control unit 115 determines whether focusing is available based on an AF result of the main frame (W0). If focusing is available (YES in step S106), the processing proceeds to step S107. If focusing is not available (NO in step S106), the processing proceeds to step S109. In addition, the system control unit 115 determines whether focusing is available by a similar method described with reference to FIGS. 4 to 7 in the first exemplary embodiment. In step S107, the system control unit 115 drives the focus lens 104 to a peak position of the main frame (W0), and then the processing proceeds to step S108. In step S108, the system control unit 115 displays an in-focus state. Then, the focusing control processing ends.

In step S109, the system control unit 115 increments the variable i, indicating the order of size of a subframe, and then the processing proceeds to step S110. In step S110, the system control unit 115 determines whether the i-th largest focus adjustment area (frame Wi) except the main frame exists, that is, whether i is equal to or less than M. If the i-th largest focus adjustment area exists (YES in step S110), the processing proceeds to step S111. If the i-th largest focus adjustment area does not exist (NO in step S110), the processing proceeds to step S113.

In step S111, the system control unit 115 determines whether focusing is available based on an AF result of the frame Wi, as described with reference to FIGS. 4 to 7. If focusing is available (YES in step S111), the processing proceeds to step S112. If focusing is not available (NO in step S111), the processing returns to step S109. In step S109, the system control unit 115 repeats the above-described processing.

In step S112, the system control unit 115 checks whether the difference between a peak position of the main frame (W0) and a peak position of the frame Wi is greater than a depth β. If the difference is greater than the depth β (YES in step S112), the processing proceeds to step S113. If the difference is not greater than the depth β (NO in step S112), the processing proceeds to step S107. In step S107, the system control unit 115 drives the focus lens 104 to the peak position of the frame Wi, and then the processing proceeds to step S108. In step S108, the system control unit 115 displays an in-focus state. Then, the focusing control ends. In addition, an in-focus display frame can be the main frame or the frame Wi.

In step S113, the system control unit 115 drives the focus lens 104 to a predetermined position or the peak position of the main frame, and then the processing proceeds to step S114. In step S114, the system control unit 115 displays an out-of-focus state. Then, the focusing control ends.

According to the above-described second exemplary embodiment, when focusing is not available based only a focus evaluation value in a main focus adjustment area, the system control unit 115 performs focusing control using a main focus adjustment area and a focus adjustment subarea or subareas including an area around the main focus adjustment area. As a result, there is no problem such as missing of a background, a focus adjustment area can be expanded, and the S/N ratio can be improved. Thus, focusing accuracy can be improved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions. This application claims priority from Japanese Patent Application No. 2007-240183 filed Sep. 14, 2007, which is hereby incorporated by reference herein in its entirety.

What is claimed is:

1. An imaging apparatus comprising:
a setting unit configured to set a main area and a plurality of subareas around the main area in an image obtained from an imaging unit, wherein the plurality of subareas do not include the main area;
an acquisition unit configured to acquire each focus evaluation value indicating a focusing state and each in-focus point based on the each focus evaluation value of the main area and the plurality of subareas in accordance with an image obtained from an imaging unit at each of a plurality of focus lens positions while moving a focus lens;
a determination unit configured to determine whether the focus evaluation value of the main area satisfies a predetermined condition; and
a focusing control unit configured to, if it is determined by the determination unit that the focus evaluation value of the main area does not satisfy the predetermined condition, perform focusing control based on a focus evaluation value obtained by combining the focus evaluation value of the main area with the focus evaluation value of the subarea having an in-focus point located within the predetermined range from the in-focus point of the main area.

2. The imaging apparatus according to claim 1, wherein the determination unit is configured to determine whether the combined focus evaluation value satisfies the predetermined condition, and
wherein the focusing control unit combines the focus evaluation value of the main area with the focus evaluation value of the subarea having an in-focus point located within the predetermined range from the in-focus point of the main area, in an order from the subarea having an in-focus point near the main area among the subarea having an in-focus point located within the predetermined range from the in-focus point of the main area, and performs focus control based on the combined focus evaluation value at the time when the determination unit determined that the combined focus evaluation value satisfies the predetermined condition.

3. The imaging apparatus according to claim 1, wherein the focusing control unit is configured to drive the focus lens to the in-focus point of the main area if it is determined that the focusing state of the main area satisfies the predetermined condition.

4. The imaging apparatus according to claim 1, wherein the main area includes an arbitrarily set area.

5. The imaging apparatus according to claim 1, further comprising a detection unit configured to detect an object satisfying a predetermined condition from an image obtained from the imaging unit,
wherein the detection unit is configured to set an area including the object detected by the detection unit as the main area.

6. The imaging apparatus according to claim 5, wherein the object includes a face of human being.

7. A focusing control method comprising:
setting a main area and a plurality of subareas around the main area in an image obtained from an imaging unit, wherein the plurality of subareas do not include the main area;
acquiring each focus evaluation value indicating a focusing state and each in-focus point based on the each focus evaluation value of the main area and the plurality of subareas in accordance with an image obtained from the imaging unit at each of a plurality of focus lens positions while moving a focus lens;
determining whether the focus evaluation value of the main area satisfies a predetermined condition; and
if it is determined that the focus evaluation value of the main area does not satisfy the predetermined condition, performing focusing control based on a focus evaluation value obtained by combining the focus evaluation value of the main area with the focus evaluation value of the subarea having an in-focus point located within the predetermined range from the in-focus point of the main area.

* * * * *